United States Patent
Bentley

(10) Patent No.: US 11,585,972 B2
(45) Date of Patent: Feb. 21, 2023

(54) MULTI-AXIS POLARIZER FILM FOR ANTI-COUNTERFEIT APPLICATIONS AND METHOD OF MAKING THE SAME

(71) Applicant: American Polarizers, Inc., Reading, PA (US)

(72) Inventor: Nicholas K. Bentley, Fleetwood, PA (US)

(73) Assignee: American Polarizers, Inc., Reading, PA (US)

( * ) Notice: Subject to any disclaimer, the term of this patent is extended or adjusted under 35 U.S.C. 154(b) by 0 days.

(21) Appl. No.: 17/578,771

(22) Filed: Jan. 19, 2022

(65) Prior Publication Data

US 2022/0137277 A1 May 5, 2022

Related U.S. Application Data

(62) Division of application No. 16/591,680, filed on Oct. 3, 2019.

(51) Int. Cl.
| | |
|---|---|
| *G02B 5/30* | (2006.01) |
| *B42D 25/391* | (2014.01) |
| *B42D 25/475* | (2014.01) |
| *B42D 25/425* | (2014.01) |

(52) U.S. Cl.
CPC ......... *G02B 5/3025* (2013.01); *B42D 25/391* (2014.10); *B42D 25/425* (2014.10); *B42D 25/475* (2014.10)

(58) Field of Classification Search
CPC ...... G02B 5/3025; G02B 5/30; B42D 25/391; B42D 25/425; B42D 25/475
See application file for complete search history.

(56) References Cited

U.S. PATENT DOCUMENTS

| | | |
|---|---|---|
| 6,124,970 A | 9/2000 | Karassev et al. |
| 6,740,472 B2 | 5/2004 | Karasev |
| 6,767,594 B1 | 7/2004 | Miroshin |
| 7,742,136 B2 | 6/2010 | Umemoto et al. |
| 7,818,782 B2 | 10/2010 | Saito |
| 8,514,354 B2 | 8/2013 | Amimori et al. |
| 8,692,958 B2 | 4/2014 | Song |
| RE44,890 E | 5/2014 | Kumasawa |
| 8,985,463 B2 | 3/2015 | Decoux et al. |
| 9,094,595 B2 | 7/2015 | Pawlik et al. |

(Continued)

FOREIGN PATENT DOCUMENTS

JP 03-294802 12/1991

*Primary Examiner* — Stephone B Allen
*Assistant Examiner* — Adam W Booher
(74) *Attorney, Agent, or Firm* — Wendy W. Koba, Esq.

(57) ABSTRACT

A manufacturing process that allows for the transfer of labels formed from polarizer film to end-use products. The polarizer film is covered by a masking layer that is typically die cut to create the labels from the continuous sheet of film. Here, an additional covering layer (or layers) of a relatively stiff material is disposed over the masking layer. The addition of the covering layer results in the processed polarizer film being less susceptible to damage (related to unwanted bending) during further processing and/or shipment. Advantageously, the covering layer improves the ability to remove individual labels from the film, particularly with respect to attempting to peel off the thin masking layer.

6 Claims, 3 Drawing Sheets

(56) References Cited

U.S. PATENT DOCUMENTS

| | | | |
|---|---|---|---|
| 9,423,545 | B2 | 8/2016 | Merrill et al. |
| 10,062,307 | B2 | 8/2018 | Liu et al. |
| 2006/0191861 | A1 | 8/2006 | Mitterhofer |
| 2009/0053516 | A1 | 2/2009 | Davidovits |
| 2010/0304019 | A1 | 12/2010 | Baron et al. |
| 2012/0007351 | A1 | 1/2012 | Suzuki et al. |
| 2015/0360500 | A1 | 12/2015 | Lok |
| 2016/0238766 | A1 | 8/2016 | Huang et al. |
| 2018/0354225 | A1* | 12/2018 | Solomon ............... B32B 37/144 |
| 2019/0105938 | A1* | 4/2019 | Holmes ................ G02B 5/1861 |

* cited by examiner

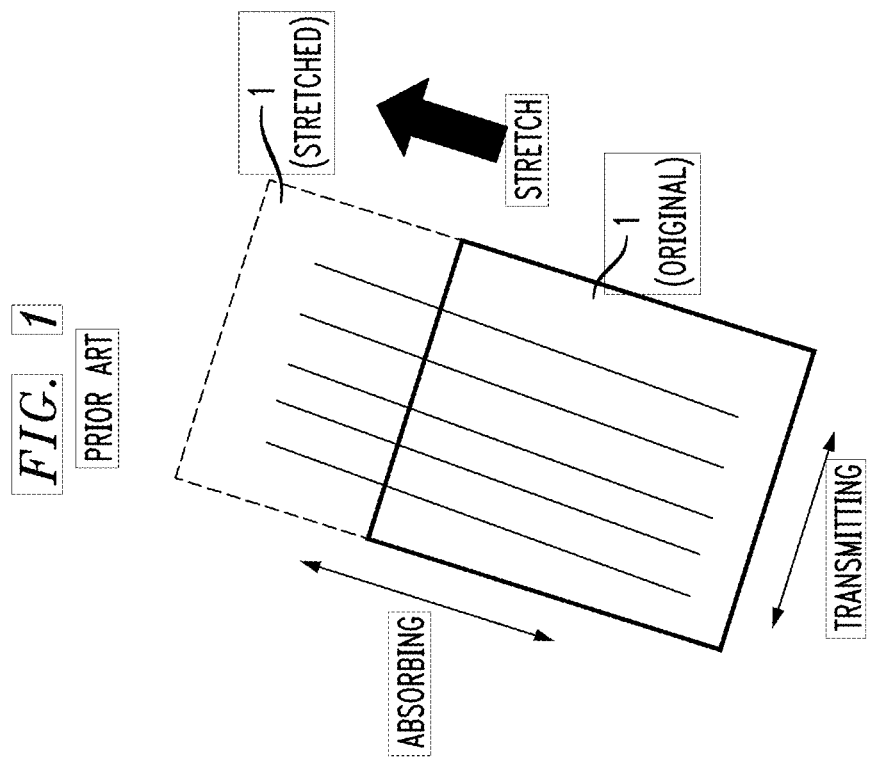
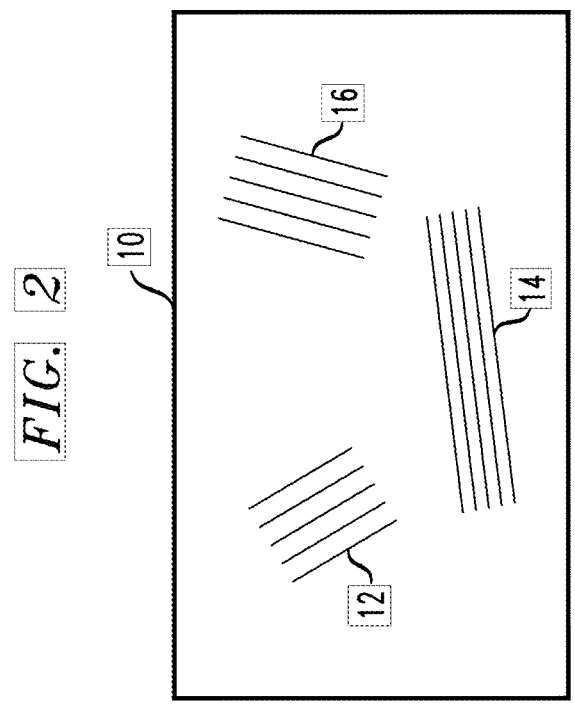

MULTI-AXIS POLARIZER FILM FOR ANTI-COUNTERFEIT APPLICATIONS AND METHOD OF MAKING THE SAME

CROSS-REFERENCE TO RELATED APPLICATIONS

This application is a divisional of U.S. patent application Ser. No. 16/591,680, filed Oct. 3, 2019 and herein incorporated by reference.

TECHNICAL FIELD

The present invention relates to polarizer films used, for example, in the formation of anti-counterfeit labeling and, more particularly, to a multi-axis polarizer film that exhibits a random quality that defeats attempts to copy the label.

BACKGROUND OF THE INVENTION

Invisible indicia printed with an optically active material on a substrate can be used as a covert security feature on products and product packaging. The product is then authenticated by revealing the invisible indicia with the use of an appropriate source of polarized light or a polarized filter.

To select a suitable anti-counterfeit technology, it needs to be not only easy to be recognized but also difficult to be copied, so that the selected anti-counterfeit technology can truly provide the desired protection. One such technology utilizes a polarizer film (linear or circular) to create indicia that is only revealed when viewed with polarized light (and thus otherwise "invisible" to the naked eye).

In the field of linear polarizers, some improvements in anti-counterfeiting have been associated with the use multiple layers of polarizing film, each oriented at a different polarization, such that a given "stack" of multiple films will exhibit a more complicated polarization pattern. However, the cost and complexity of such a multilayer process is considered to be a disincentive to widespread use.

SUMMARY OF THE INVENTION

The needs remaining in the art are addressed by the present invention, which relates to polarizer films and, more particularly, to a multi-axis polarizer film created using a printing process of multiple sets of axes at different spatial locations on a single layer of film.

Instead of "stretching" a film to create polarization axes as in the prior art, a printing plate (patterned to include several sets of grooves at various orientations; a "multi-axis" pattern) is used to transfer the multi-axis groove pattern to a plastic film. The patterns take the form of shallow grooves embossed in the film. The grooved film is then saturated with an appropriate polarizing liquid dye material (e.g., iodine or any other suitable dichroic liquid dye). The dye molecules align with the multi-axis grooves in the film, and thus create a polarizer with a multi-axis pattern, defined only by the printed groove pattern. This is in contrast to prior art arrangements where the polarizer film was limited to a two-axis form defined by the stretch direction of the film itself.

In addition to the creation of a multi-axis polarization film, the present invention provides an improved manufacturing process that allows for the transfer of labels formed from this polarizer film to end-use products.

Other and further aspects and embodiments of the present invention will become apparent during the course of the following discussion and by reference to the accompanying drawings.

BRIEF DESCRIPTION OF THE DRAWINGS

Referring now to the drawings, where like numerals represent like parts in several views:

FIG. 1 is a diagram illustrating the prior art technique of stretching the film to create defined lines for polarization of the film;

FIG. 2 is a simplified diagram of a multi-axis polarizer film formed in accordance with the present invention;

DETAILED DESCRIPTION

Figure 3:
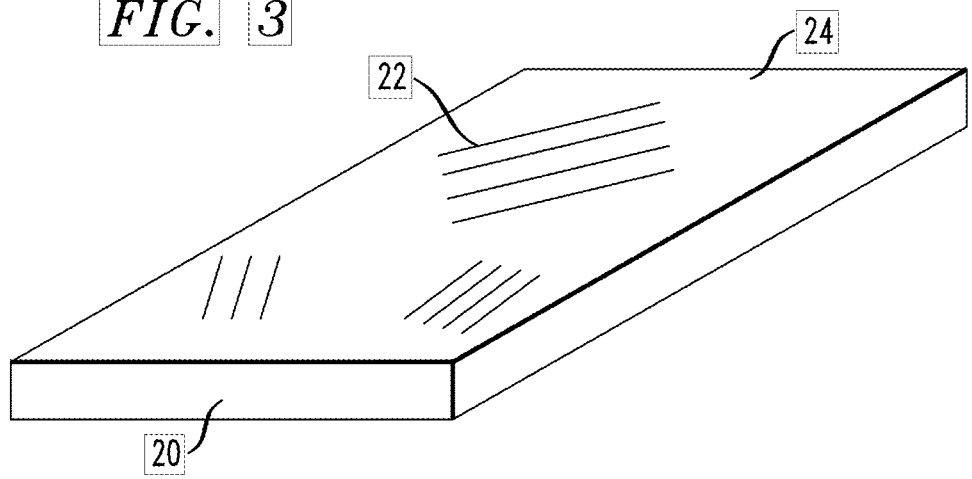
FIG. 3 illustrates an exemplary printing plate used to create multiple patterns of spatially-separated lines across the surface of a film.

Most film-based polarized sheets are made by a stretching process that applies a tension to the film so as to create an "absorbing axis" that runs parallel to the stretch direction, with the "transmitting axis" thus running perpendicular to the stretch direction. FIG. 1 illustrates this prior art principle, showing a section of stretched film 1 (for example, a film of polyvinyl-alcohol (PVA)) with an absorbing axis A in the direction shown. A suitable liquid polarizing dye material (for example, iodine), is applied to the stretched film. The iodine molecules align along the absorbing axis A of the PVA film and thus create the polarizing effect. Such a film is typically defined as a "linear" polarizer, since the dye molecules will be disposed in lines along the absorbing axis. It is clear that the axes are defined by the stretching process and that a given sheet of film is limited to exhibit only a 2-axis polarization configuration (i.e., an absorbing axis and a transmitting axis).

Instead of using a stretching process, a multi-axis polarizer film is formed in accordance with the present invention by using a printing process to create a plurality of sets of "grooves" at various, different locations across the surface of the film. As described in detail below, a printing plate may be used in one process of introducing the sets of grooves to a standard film, where the printing plate is formed to include a number of grooves (in the form of sets of parallel grooves in different spatial locations organized in any desired pattern, including a random pattern). The printing plate then transfers the grooves to a plastic film (such as PVA, or cellulose triacetate (CTA), or any other plastic film material used for this purpose) in a simple printing (embossing) process. A rotogravure printing process (or other suitable process) is then used to apply a liquid polarizing dye material (e.g., iodine or other suitable dichroic liquid dye) to the printed film. The dye molecules will thus align along the various grooves formed in the film, forming a multi-axis polarizer film in accordance with the present invention, where the specific "groove pattern" in the film defines the orientations of the multi-axis polarizer. Indeed, a significant aspect of the present invention is that a specific, unique set of grooves may be associated with a particular product, vendor, or the like, providing yet another level of source authenticity.

FIG. 2 illustrates an exemplary multi-axis polarizer film 10 formed in accordance with the present invention. In this exemplary embodiment, a set of three different groove patterns 12, 14, and 16 are shown as formed at different spatial locations in film 10. Each pattern is shown as comprising several parallel grooves. These patterns are exemplary only; a significant advantage of the printing technique of the present invention is the ability to form grooves along various axial directions at different locations along film 10. Each pattern is shown as exhibiting a different angle of orientation with respect to what would be the "stretch" (absorbing) axis in a prior art film. The ability to replicate such a multi-axis pattern using the conventional stretch process is considered to be essentially impossible; thus, the use of the multi-axis polarizer film of the present invention as an authentication label is considered to be a preferred alternative.

Figure 4:
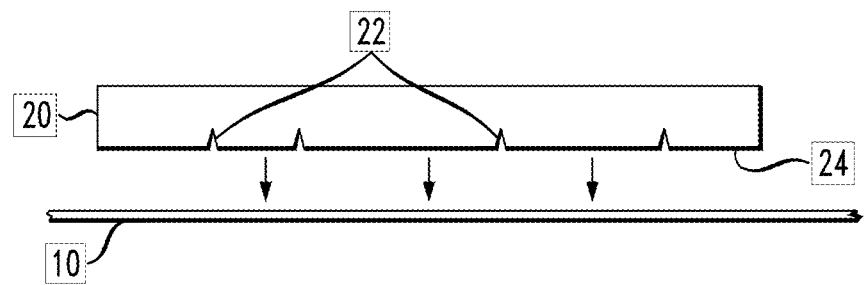
FIG. 4 is a diagram depicting an exemplary process of transferring the pattern from the printing plate of FIG. 3 to a section of film.
Figure 5:
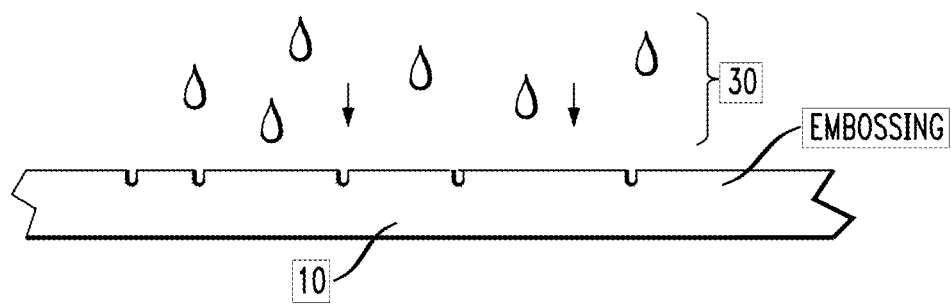
FIG. 5 illustrates the application of a dichroic dye to the printed film of FIG. 4, creating sets of polarized lines at different spatial locations across the film.

FIGS. 3-5 illustrate an exemplary set of steps that may be used to form a multi-axis polarizer film in accordance with the principles of the present invention.

FIG. 3 shows a printing plate 20 that is formed to include a plurality of grooves 22 formed in a plate top surface 24. Grooves 22 comprise sets of parallel lines and may be formed by etching grooves using known photolithographic processes, mechanical processes, or the like. In one case, printing plate 20 may be formed of an aluminum plate. Grooves 22 are shown as formed in different orientations at different locations across the surface of printing plate 20. For example, it is possible to expose different sections of plate 20 at different times, thus providing the ability to create grooves running in different directions in any random pattern. The use of a spatial distribution of different sets of parallel grooves thus allows for the formation of a "multi-axis" polarization film in accordance with the principles of the present invention.

FIG. 4 illustrates the next step in the process, where printing plate 20 is then pressed into film 10 to transfer the groove pattern to film 10. Thus, referring back to FIG. 2, the printing process is used to create groove patterns such as 12, 14, and 16 across a section of film 10. As the film continues to move with respect to plate 20, the pattern is continuously transferred to subsequent sections of film 10. At times, this is referred to as an embossing process or a printing process.

Lastly, a polarizing liquid dye material 30 is applied to the embossed film, as shown in FIG. 5 (the term "applied" is considered to included processes where the film is placed in a liquid bath of dye material 30). As described above, the dye molecules in liquid 30 will align along each set of groove patterns (such as 12, 14, and 16) forming a separate "polarizer" section along the axis of each groove pattern, creating a "multi-axis" polarizer film. A rotogavure process is one exemplary process that may be used for transferring the polarizing liquid to the film, where a rotating printing plate is engaged with a moving film to continuously "print" the pattern into newly-presented sections of the film.

Once the multi-axis polarizer is created on a film, an adhesive is applied to the film and then the film is cut into the individual elements. A coating of clear or reflective material may be applied to the multi-axis polarizer film prior to applying the adhesive. Typically, laser or die cutting is used to define the outline of the individual elements. A protective layer of masking material is preferably used to protect the "raw" surface of the polarizer film during the cutting procedure. The masking layer may be applied to only one side of the polarizer film, or both sides of the film. The masking layer is typically thin, and needs to be easily "peelable" once the individual devices have been formed. Depending on the size of the individual devices, it may be difficult (or tedious) to peel away the small size, thin masking material.

Another aspect of the present invention relates to a simplified process for later separating out individual elements (e.g., labels used for products as an anti-counterfeiting device) from a polarizer film.

Figure 6:
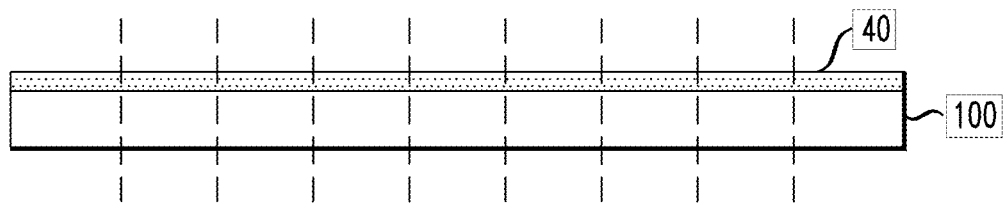
FIG. 6 shows a subsequent step in the formation of individual polarized devices, including cutting through the polarized film, with a thin protective masking layer used to protect the surface of the polarizer film.

FIG. 6 is a side view of an exemplary polarizer film 100 with a protective masking layer 40, where a laser cutting operation has been performed (indicated by the vertical dashed lines) to create a plurality of individual devices 100-1, 100-2, . . . , 100-N, each device still including its portion of overlying protective masking layer 40. It is to be understood that a second protective masking layer 40' may be placed across the bottom surface of film 100; for the sake of clarity, the drawings shown only a masking layer on the top-side of film 100. Once masking layer(s) 40 is(are) in place, film 100 may also be cut into long strips, each strip retaining its portion of protective masking layer(s) 40, with some type of frame-tab structure used to keep the individual devices 100-1 through 100-N from being fully removed from film 100.

Figure 7:
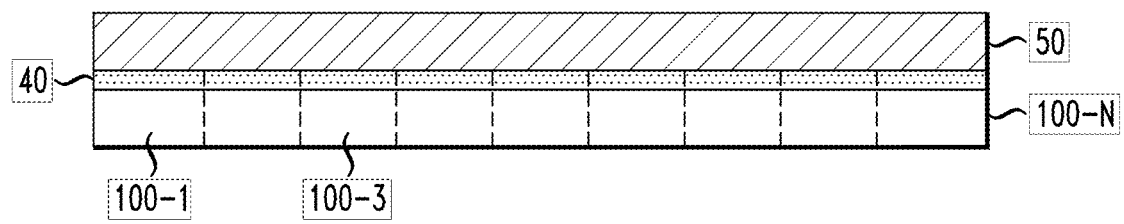
FIG. 7 shows a step of applying a stiff, protective covering to the cut film.

In accordance with the present invention, instead of attempting to remove layer 40 from the individual devices 100-i, a covering layer 50 is disposed over and attached to protective masking layer 40 subsequent to the laser cutting step. This is shown in FIG. 7, which again only shows a covering layer 50 over the "top" side of film 10; it is to be understood that if an additional masking layer 40' is disposed across the bottom surface of film 10, an additional covering layer 50' may be positioned over masking layer 40'. In accordance with the process of the present invention, covering layer(s) 50 is(are) perhaps stiffer than protective masking layer 40, and may also be thicker, although this is not a requirement. A benefit of covering layer 50 is that the further processing and shipment of processed polarizer film 10 will be less susceptible to damage from bending.

Figure 8:
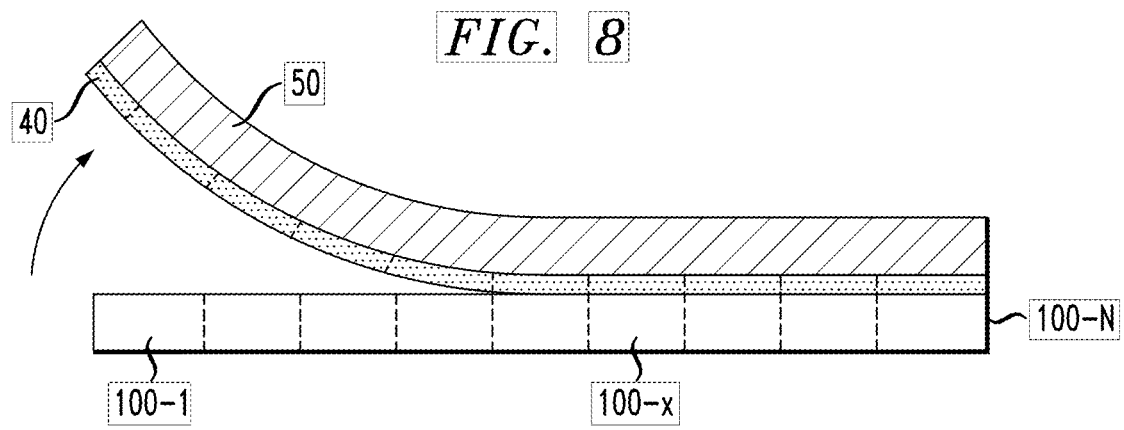
FIG. 8 shows a step of removing the stiff, protective covering (as well as an underlying protective thin masking layer) in the formation of individual devices.

Once it is desired to place individual devices 100-i on end-use products or labeling, the user peels off one or both of layers 50 (as the case may be), which takes protecting covering layer(s) 40 along during the removal process, as shown in FIG. 8. The user can thus simply remove individual devices 100-1 through 100-N from the strip.

Various modifications and alterations of this invention will be apparent to those skilled in the art without departing from the spirit and scope of the invention. Indeed, it should be understood that this invention is not limited to the illustrative embodiments set forth herein and is instead contemplated as being limited only by the scope of the claims appended hereto.

What is claimed is:

1. A method of making anti-counterfeit polarized labels, the method comprising the steps of:
   a) providing a sheet of polarizer film formed to include an anti-counterfeit polarization pattern;
   b) applying a masking layer over an exposed major surface of the polarizer film;

c) cutting through a portion of the thickness of the structure of step b) at predetermined locations defined as boundaries for individual label elements, retaining a web frame portion of the masking layer;
d) applying a covering layer over the cut surface of the masking layer so as to adhere to each cut portion of the masking layer; and
e) pulling the covering layer away from the major surface of the sheet of polarizer film, wherein the act of pulling the covering layer also removes the underlying, adhered cut portions of the masking layer.

2. The method as defined in claim 1 wherein steps b) through d) are repeated on a remaining, opposing major surface of the polarizer film, with step e) used to pull the covering layer away from both major surfaces of the polarizer film.

3. The method as defined in claim 1, wherein step a) is further defined as providing a multi-axis polarizer film, and includes the individual steps of:
a1) providing a sheet of plastic film;
a2) embossing the sheet of plastic film with a plurality of sets of grooves, each set comprising several parallel grooves of a given length and each set disposed at a different location along the sheet of plastic film and oriented at a different direction with respect to a longitudinal axis of the sheet of plastic film; and
a3) applying a polarizing liquid dye to the embossed sheet of plastic film, wherein molecules of the polarizing liquid dye align with the plurality of sets of grooves and form multiple axes of polarization within the embossed sheet of plastic film to create a multi-axis polarizer film.

4. The method as defined in claim 1 wherein step d) is performed multiple times to form multiple covering layers the over the masking layer, a subsequent covering layer adhering to a top surface of a previously applied covering layer.

5. The method as defined in claim 4 wherein step d) is performed until the combination of multiple covering layers is thicker than the previously applied masking layer.

6. The method as defined in claim 1 wherein the covering layer comprises a material thicker than that of the masking layer.

\* \* \* \* \*